US008370553B2

(12) United States Patent
Auerbach et al.

(10) Patent No.: US 8,370,553 B2
(45) Date of Patent: Feb. 5, 2013

(54) FORMAL VERIFICATION OF RANDOM PRIORITY-BASED ARBITERS USING PROPERTY STRENGTHENING AND UNDERAPPROXIMATIONS

(75) Inventors: Gadiel Auerbach, Jerusalem (IL); Fady Copty, Nazareth (IL); David J. Levitt, Haifa (IL); Viresh Paruthi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 285 days.

(21) Appl. No.: 12/906,495

(22) Filed: Oct. 18, 2010

(65) Prior Publication Data

US 2012/0096204 A1 Apr. 19, 2012

(51) Int. Cl.
G06F 12/00 (2006.01)

(52) U.S. Cl. ......... 710/244; 710/240; 710/200; 710/260

(58) Field of Classification Search .......... 710/240–244, 710/200, 260–269
See application file for complete search history.

(56) References Cited

U.S. PATENT DOCUMENTS

| | | | | |
|---|---|---|---|---|
| 5,935,234 | A * | 8/1999 | Arimilli et al. | ............... 710/244 |
| 6,718,422 | B1 | 4/2004 | Kelley et al. | |
| 7,120,714 | B2 | 10/2006 | O'Connor et al. | |
| 7,266,575 | B2 | 9/2007 | Ikeda | |
| 7,752,369 | B2 | 7/2010 | Kailas et al. | |
| 2006/0026329 | A1 | 2/2006 | Yu | |
| 2010/0227636 | A1* | 9/2010 | Kwon et al. | .................. 455/512 |

OTHER PUBLICATIONS

Kailas, Krishmnan et al., "formal Verification of Corrrectness and Performance of Random Priority-based Arbiters", IEEE, Formal Methods in Computer-Aided Design, Nov. 2009, 7 pages.*

Allemand, Michel et al., "A Synchronous Approach for Hardware Design", IRISA, Publication Interne N 1131, Oct. 1997, 36 pages.
Baumgartner, Jason et al., "Scalable Liveness Checking via Property-Preserving Transformations", Design Automation and Test in Europe, 2009, 6 pages.
Biere, Armin et al., "Liveness Checking as Safety Checking", FMICS '02, 2002, 18 pages.
Dershowitz, Nachum et al., "Bounded Fairness", Lecture Notes in Computer Science, vol. 2772, 2003, pp. 304-317.
Goel, Amit et al., "Formal Verification of an IBM CoreConnectTM Processor Local Bus Arbiter Core", Proceedings of the 37th Annual Design Automation Conference, Los Angeles, California, 2000, pp. 196-200.
Kailas, Krishnan et al., "Formal Verification of Correctness and Performance of Random Priority-based Arbiters", IEEE, Formal Methods in Computer-Aided Design, Nov. 2009, 7 pages.
Le, Thuyen et al., "Formal Verification of a Pervasive Interconnect Bus System in a High-Performance Microprocessor", ACM, EDAA, 2007, pp. 219-224.

(Continued)

*Primary Examiner* — Brian Misiura
*Assistant Examiner* — Kim Huynh
(74) *Attorney, Agent, or Firm* — Francis Lammes; Stephen J. Walder, Jr.; Diana R. Gerhardt

(57) ABSTRACT

A mechanism is provide for formally verifying random priority-based arbiters. A determination is made as to whether a random priority-based arbiter is blocking one of a set of output ports or a set of input ports. Responsive to the first predetermined time period expiring before the processor determines whether the random priority-based arbiter is blocking, a determination is made as to whether the random priority-based arbiter is blocking one of the set of output ports or the set of input ports within a second predetermined time period using the random seed and at least one of property strengthening or underapproximation. Responsive to the processor determining that the random priority-based arbiter satisfies a non-blocking specification such that not one of the set of output ports or the set of input ports is blocked within the second predetermined time period, the random priority-based arbiter is validated as satisfying the non-blocking specification.

20 Claims, 3 Drawing Sheets

OTHER PUBLICATIONS

Maraninchi, Florence et al., "Model-driven High-level Programming of Embedded Systems: Selected papers from SLA++P'07 and SLA++P'08", EURASIP Journal on Embedded Systems, 2007-2008, 94 pages.

Wasaki, Katsumi, "A Formal Verification Case Study for IEEE-P.896 Bus Arbiter by using a Model Checking Tool", IJCSNS International Journal of Computer Science and Network Security, vol. 7, No. 3, Mar. 2007, pp. 184-192.

* cited by examiner

FORMAL VERIFICATION OF RANDOM PRIORITY-BASED ARBITERS USING PROPERTY STRENGTHENING AND UNDERAPPROXIMATIONS

BACKGROUND

The present application relates generally to an improved data processing apparatus and method and more specifically to mechanisms for formally verifying random priority-based arbiters.

Arbiters are widely used in electronic systems such as micro-processors and interconnects. Arbiters restrict access to shared resources when a number of requests exceeds a maximum number of requests that may be satisfied concurrently. For example, an arbiter that regulates access to a bus selects which requestors would be granted access to the bus if there are more concurrent requests than the bus can handle. Arbiters use various arbitration schemes in the form of a priority function to serialize access to the shared resource by the requestors. The priority function decides which requestor to grant access next. Examples of priority functions include round robin (rotate priority amongst requestors), queue-based (first-in first-out), or random priority-based (select next requestor randomly).

Random priority-based arbiters have been gaining in popularity because of their high potential for fair arbitration, unlike other techniques such as round robin or queue-based which may be unfair because of their fixed order of arbitration. Random priority-based arbitration allows any request to have the highest priority at random. A random priority-based arbiter uses a pseudo-random number generator to select or influence the selection of the next requestor. A common implementation of such arbiters uses a Linear Feedback Shift Register (LFSR) to generate a pseudo-random sequence of numbers. A LFSR is a cyclic shift register whose current state is a linear function of its previous state, and the LFSR generates a sequence of numbers which is statistically similar to a truly-random sequence.

SUMMARY

In one illustrative embodiment, a method, in a data processing system, is provided for formally verifying random priority-based arbiters. The illustrative embodiment monitors a set of input ports and a set of output ports to and from a random priority-based arbiter operating under a predefined property for a first predetermined time period. The illustrative embodiment determines whether the random priority-based arbiter is blocking one of the set of output ports or the input ports from either sending or receiving data for the first predetermined time period using a random seed. Responsive to the first predetermined time period expiring before the processor determines whether the random priority-based arbiter is blocking one of the set of output ports or the set of input ports using the random seed, the illustrative embodiment determines whether the random priority-based arbiter is blocking one of the set of output ports or the set of input ports within a second predetermined time period using the random seed and at least one of property strengthening or underapproximation. Responsive to the processor determining that the random priority-based arbiter satisfies a non-blocking specification such that not one of the set of output ports or the set of input ports is blocked within the second predetermined time period using the random seed and either property strengthening or underapproximation, the illustrative embodiment validates that the random priority-based arbiter satisfies the non-blocking specification.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for formally verifying random priority-based arbiters. The main concern in verification of a random priority-based arbiter is checking for starvation. Starvation is a special case of liveness properties, in which any request must have a grant eventually. Liveness properties are often computationally hard to verify even on medium-size designs. To alleviate this, a common check for starvation is performed by replacing liveness properties with bounded properties, such as "a request will be granted within N cycles", for some constant N. If a bounded property passes, then a correctness of the original liveness property is implied. Even so, the sheer size of Linear Feedback Shift Register (LFSR)-based industrial arbiters may preclude an exhaustive analysis of the bounded property.

Figure 1:
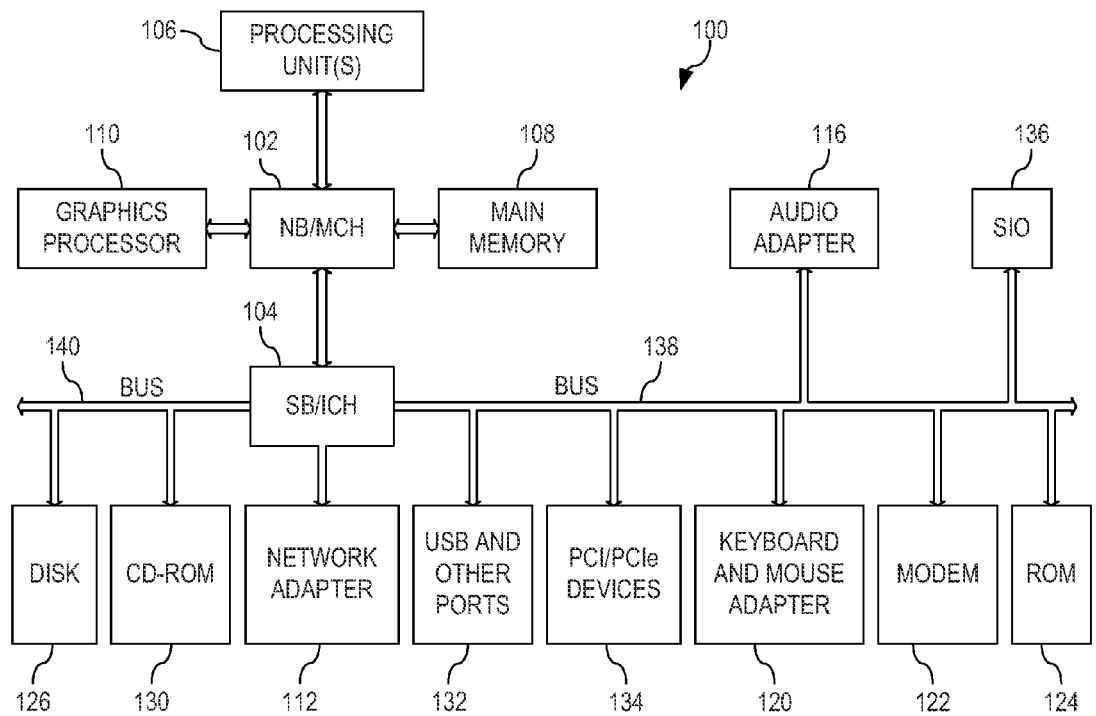
FIG. 1 shows a block diagram of an example data processing system in which aspects of the illustrative embodiments may be implemented.
Figure 2:
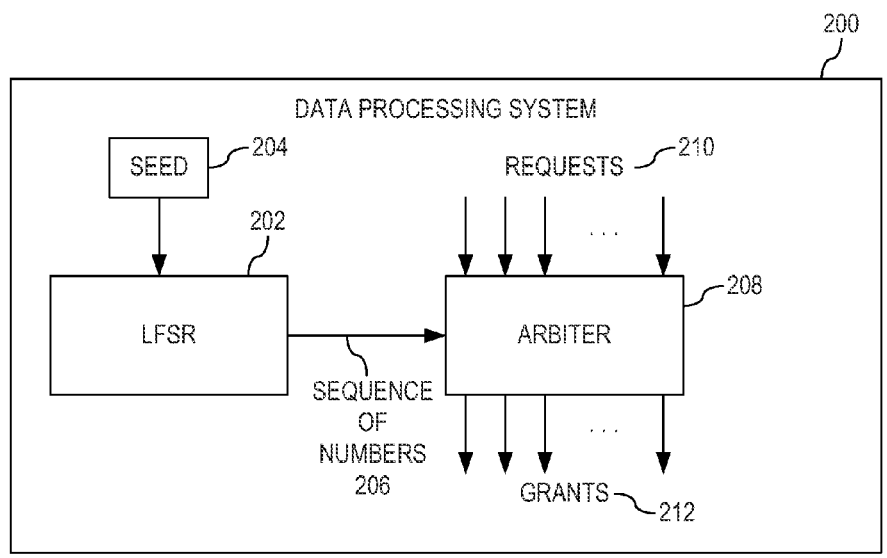
FIG. 2 shows a block diagram of a LFSR-based arbiter in accordance with an illustrative embodiment.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation of formally verifying random priority-based arbiters, this is only an example and is not intended to state or imply any limitation with regard to the features of the present invention. To the contrary, the illustrative embodiments are intended to include distributed data processing environments and embodiments in which random priority-based arbiters may be formally verified.

With reference now to the figures and in particular with reference to FIG. 1, an example diagram of a data processing environment is provided in which illustrative embodiments of the present invention may be implemented. It should be appreciated that FIG. 1 is only an example and is not intended to assert or imply any limitation with regard to the environments in which aspects or embodiments of the present invention may be implemented. Many modifications to the depicted environments may be made without departing from the spirit and scope of the present invention.

With reference now to FIG. 1, a block diagram of an example data processing system is shown in which aspects of the illustrative embodiments may be implemented. Data processing system 100 is an example of a computer in which computer usable code or instructions implementing the processes for illustrative embodiments of the present invention may be located.

In the depicted example, data processing system 100 employs a hub architecture including north bridge and memory controller hub (NB/MCH) 102 and south bridge and input/output (I/O) controller hub (SB/ICH) 104. Processing unit 106, main memory 108, and graphics processor 110 are connected to NB/MCH 102. Graphics processor 110 may be connected to NB/MCH 102 through an accelerated graphics port (AGP).

In the depicted example, local area network (LAN) adapter 112 connects to SB/ICH 104. Audio adapter 116, keyboard and mouse adapter 120, modem 122, read only memory (ROM) 124, hard disk drive (HDD) 126, CD-ROM drive 130, universal serial bus (USB) ports and other communication ports 132, and PCI/PCIe devices 134 connect to SB/ICH 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash basic input/output system (BIOS).

HDD 126 and CD-ROM drive 130 connect to SB/ICH 104 through bus 140. HDD 126 and CD-ROM drive 130 may use, for example, an integrated drive electronics (IDE) or serial advanced technology attachment (SATA) interface. Super I/O (SIO) device 136 may be connected to SB/ICH 104.

An operating system runs on processing unit 106. The operating system coordinates and provides control of various components within the data processing system 100 in FIG. 1. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 100 (Java is a trademark of Sun Microsystems, Inc. in the United States, other countries, or both).

As a server, data processing system 100 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 100 may be a symmetric multiprocessor (SMP) system including a plurality of processors in processing unit 106. Alternatively, a single processor system may be employed.

Instructions for the operating system, the object-oriented programming system, and applications or programs are located on storage devices, such as HDD 126, and may be loaded into main memory 108 for execution by processing unit 106. The processes for illustrative embodiments of the present invention may be performed by processing unit 106 using computer usable program code, which may be located in a memory such as, for example, main memory 108, ROM 124, or in one or more peripheral devices 126 and 130, for example.

A bus system, such as bus 138 or bus 140 as shown in FIG. 1, may be comprised of one or more buses. Of course, the bus system may be implemented using any type of communication fabric or architecture that provides for a transfer of data between different components or devices attached to the fabric or architecture. A communication unit, such as modem 122 or network adapter 112 of FIG. 1, may include one or more devices used to transmit and receive data. A memory may be, for example, main memory 108, ROM 124, or a cache such as found in NB/MCH 102 in FIG. 1.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system without departing from the spirit and scope of the present invention.

Moreover, the data processing system 100 may take the form of any of a number of different data processing systems including client computing devices, server computing devices, a tablet computer, laptop computer, telephone or other communication device, a personal digital assistant (PDA), or the like. In some illustrative examples, data processing system 100 may be a portable computing device which is configured with flash memory to provide non-volatile memory for storing operating system files and/or user-generated data, for example. Essentially, data processing system 100 may be any known or later developed data processing system without architectural limitation.

As discussed previously, a Linear Feedback Shift Register (LFSR)-based arbiter grants access to a pending request based a pseudo-random number generated by the LFSR at any given point in time. FIG. 2 shows a block diagram of a LFSR-based arbiter in accordance with an illustrative embodiment. In data processing system 200, which may be data processing system such as data processing system 100 of FIG. 1, LFSR 202 of length N generates a deterministic cyclic sequence whose period is $2^{\{N\}-1}$, where all numbers from 1 to $2^{\{N\}-1}$ are visited. The initial value supplied to LFSR 202 is called seed 204, and LFSR 202 generates sequence of numbers 206, which are completely determined by the value of seed 204, are supplied to arbiter 208. Arbiter 208 may arbitrate between M requestors 210, where M is much smaller than $2^{\{N\}}$, using LFSR 202 of length N by sampling a subset log(M) bits of LFSR 202 to select the next grant 212. Although not illustrated, a design, such as that shown in FIG.

2, may help to amortize the cost of implementing a LFSR in hardware by way of the same LFSR serving multiple arbiters with different tap points. For example, N may be 16 while M is 8 requiring 3-bits of the 16-bits of the LFSR to be tapped for a single arbiter.

Figure 3:
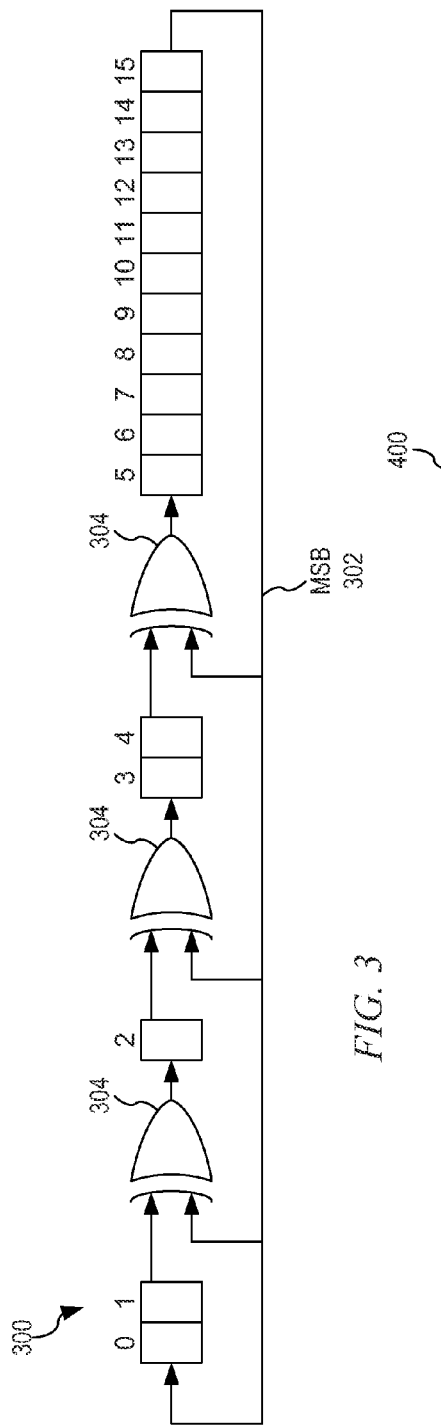
FIG. 3 depicts one example of an LFSR in accordance with an illustrative embodiment.

FIG. 3 depicts one example of an LFSR, such as LFSR 202 of FIG. 2, in accordance with an illustrative embodiment. LFSR 300 is an example of a 16-bit LFSR. LFSR 300 shifts bits from left to right with some bits, for example, bits 1, 2, and 4, XORed using XOR gates 304 with most significant bit 302. A seed provided to LFSR 300 may be configurable and may be assigned any value between 1 and 2{16}−1 or 265535. Formal verification environments typically assign a non-deterministic value to the seed.

Again, verification of arbiters entails checking for starvation, which may be formulated as a liveness property. For example, the following Property Specification Language (PSL) property specifies that whenever signal request is asserted, signal grant is asserted at some time in the future.

always request→eventually! (grant)

A counter-example for such a property is a trace showing a path leading to an infinite loop where a specific request fails to be granted. In an LFSR-based arbiter, such an infinite loop constitutes a cycling through of all the valuations of the LFSR. The LFSR minimal loop length is $2^{\{N\}-1}$, thus any loop showing a counter-example of the liveness property must be at least of that length. Hence, finding a trace for such a property of an LFSR-based arbiter may be very difficult. An easier, yet more useful, alternative to the above correctness property is to check for a request to be granted within a specified number of cycles, determined by the arbiter specification. In other words, a determination may be made to see whether a request is granted within k cycles. In addition to verifying that a request is granted, such a formulation may give insights into the performance aspects of the arbiter, which is quite useful given the critical role arbiters play in the overall performance of electronic systems. The following property expresses a bounded-starvation condition.

always request→next_e[1 ... k](grant)

Note that arbiters are generally treated as many-to-one arbiters, that is, many requestors accessing a single shared resource. The general case is many-to-many arbiter. This implies that starvation is a combination of starvation of a requestor, or a blocking of a resource. Thus, a bounded-starvation property should be refined and a target of the request is specified. always request(target)→next e[1 ... k] (grant). This formulation is important to verify arbitration in routers.

However, exhaustive verification to guarantee lack of bugs on the above properties is becoming increasingly challenging, if not impossible, for arbiters in real-world systems due to their sheer size and complexity. Thus, the illustrative embodiment provide for bug hunting so as to detect as many bugs as possible using scalable underapproximate techniques and formal analysis. That is, the illustrative embodiments provide for a more practical means to provide concrete traces rather than suspicious bounded pass due to suspect abstractions.

The illustrative embodiments provide mechanisms to uncover bugs leading to long latencies before requestors are granted in such complex arbiters. If the bounded property fails, the illustrative embodiments investigate the counter-example and attempt to either fix the problem by increasing the bound or to use the information from the counter-example to underapproximate the original design. While the examples in the illustrative embodiments are directed to a LFSR, one of ordinary skill in the art will recognize that the concepts may be easily generalized to other schemes (besides LFSRs) to implement a random priority function. For example, the presented concepts may, in fact, be generalized to model checking of general-purpose systems without departing from the spirit and scope of the invention.

Figure 4:
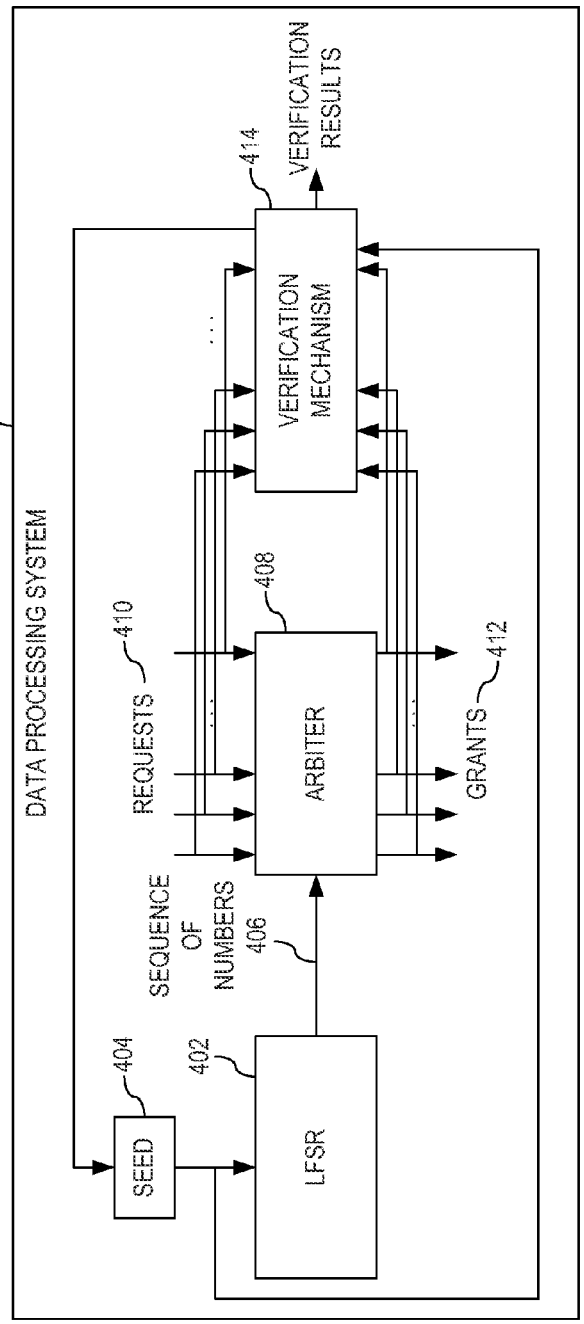
FIG. 4 depicts a block diagram of a verification mechanism for formally verifying random priority-based arbiters in accordance with an illustrative embodiment.

FIG. 4 depicts a block diagram of a verification mechanism for formally verifying random priority-based arbiters in accordance with an illustrative embodiment. Data processing system 400, which may be data processing system such as data processing system 100 of FIG. 1, may comprise Linear Feedback Shift Register (LFSR) 402, arbiter 408, and verification mechanism 414. As with the LFSR 202 in FIG. 2, LFSR 402 of length N generates a deterministic cyclic sequence whose period is $2^{\{N\}-1}$, where all numbers from 1 to $2^{\{N\}-1}$ are visited. The initial value supplied to LFSR 402 is called seed 404, and LFSR 402 generates sequence of numbers 406, which are completely determined by the value of seed 404, that are supplied to arbiter 408. Arbiter 408 may arbitrate between M requests 410, where $M<<2^{\{N\}}$, using LFSR 402 of length N by sampling a subset log(M) bits of LFSR 402 to select the next grant 412.

The complexity of property checking of a LFSR-based arbiter is a function of the property and the design-under-test (DUT). The bug-hunting approach of the illustrative embodiments considers both the property and the DUT. Underapproximation and overapproximation techniques are commonly used to falsify properties or prove a correctness of the properties. The illustrative embodiments focus bug hunting of safety properties based on underapproximations to obtain traces falsifying the property, which are then validated on a concrete/original model.

Seed 404 of an N-bit LFSR 402 may range between 1 and $2^{\{N\}-1}$. Seed 404 fully determines a sequence of LFSR 402, so a run of arbiter 408 is based on one of $2^{\{N\}-1}$ possible seeds. In order to underapproximate arbiter 408, verification mechanism 414 may fix seed 404 by assigning a constant N-bit number as seed 404. A fixed-seed underapproximates arbiter 408 as every run of a now fixed-seed arbiter 408 corresponds to a single sequence of numbers 406 provided by LFSR 402. If a bounded-starvation property fails in fixed-seed arbiter 408, then the bounded-starvation property will definitely fail in a nondeterministic-seed arbiter. Additionally, a counter-example that demonstrates a fail of a safety property in fixed-seed arbiter 408 is also valid in a nondeterministic-seed arbiter.

Falsification of a k-cycle starvation property in arbiter 408 requires checking sequence of number 406 from LFSR 402 that allows $2^{\{N\}-1}$ possible sequence of number 406. In order to address the inherent hardness of generating and checking $2^{\{N\}-1}$ possible sequence of number 406, verification mechanism 414 alternates between checking easier-to-check properties on arbiter 408 using a random seed 404 and checking an original property on arbiter 408 with a fixed seed 404. That is, verification mechanism 414 iteratively checks starvation with lesser bounds on arbiter 408 using seed 404 and starvation with the original bound on using seed 404 fixed by verification mechanism 414 looking for sequence of number 406 that are likely to cause long starvation.

Thus, the following properties are defined that express lesser request-to-grant delays.

p_{j}=request→next_e[1 ... j] (grant)

where j is a value less than k. Thus, checking any of the properties p_{j} may be done in a shorter period of time than the original property. That is, every run that starves a request for k cycles starts with a starvation of j cycles, but a starvation of j cycles does not necessarily end with a starvation of k cycles. If a property p_{j} fails in the concrete system and a counter-example is generated, verification mechanism 414 underapproximates arbiter 408 by restricting arbiter 408 to the very same sequence of number 406 that the counter-example reveals. Thus, checking a fixed-seed arbiter may be faster and may result in discovering a k-cycle long starvation.

In order to formally verify that arbiter 408 will function without starvation, verification mechanism 414 first checks whether a predefined property P may be validated using LFSR 402 within a predetermined time period. That is, using a random seed 404 for only the predetermined time period, verification mechanism 414 monitors both requests 410 (inputs) and grants 412 (outputs) to determine whether arbiter 408 is fairly granting all of requests 410. During the predetermined time period, verification mechanism 414 keeps a record of the results of comparing grants 412 to requests 410. If during the predetermined time period verification mechanism 414 detects a set of grants 412 that corresponds to each the set of requests 410, then verification mechanism 414 validates arbiter 408 as passing or satisfying a non-blocking specification such that no input port (requests 410) or output port (grants 412) are being blocked by arbiter 408.

If, during the predetermined time period, verification mechanism 414 determines that arbiter 408 has failed to grant any one of requests 410 within a predefined bound k, then verification mechanism 414 indicates that the property P does not hold on arbiter 408 and generates a trace demonstrating the failure. That is, verification mechanism 414 may be able to determine, by comparing grants 412 to requests 410, that arbiter 408 may never grant all of requests 410 because, for example, arbiter 408 is simply switching between two grants and never proceeds past the two grants. Thus, verification mechanism 414 determines that arbiter 408 has starved or blocked one of requests 410 from sending and/or receiving data without running for the entire predetermined time period.

Still using the predefined property P, if the predetermined time period expires before verification mechanism 414 validates or invalidates arbiter 408, then verification mechanism 414 stops the validation of arbiter 408 and begins a process to check arbiter 408 using property strengthening and underapproximation. As the process begins, verification mechanism 414 sets a $j_{min}$ variable equal to 1 and a $j_{max}$ variable equal to a maximum number of cycles k allowed between a request and a grant as determined by a specification set by a user. Verification mechanism 414 then determines whether $j_{min}$ is less than $j_{max}$. If $j_{min}$ is greater than or equal to $j_{max}$, verification mechanism 414 indicates that the validation of arbiter 408 is undeterminable. If $j_{min}$ is less than $j_{max}$, then verification mechanism 414 sets a variable j equal to a value of $(j_{min}+j_{max})/2$, which indicates property strengthening. That is, verification mechanism 414 sets the number of cycles allowed between a request and a grant as specified to approximately half in order to validate arbiter 408 faster.

Then, using a random seed and for only the predetermined time period, verification mechanism 414 again monitors requests 410 and grants 412 to and from arbiter 408 to determine whether arbiter 408 is fairly granting all of requests 410 without starvation. If during the predetermined time period arbiter 408 detects a set of grants 412 that corresponds to each the set of requests 410, then verification mechanism 414 validates arbiter 408 as passing. If the predetermined time period expires before verification mechanism 414 validates or invalidates arbiter 408, verification mechanism 414 resets $j_{max}$ to equal the value of j. Verification mechanism 414 then determines whether $j_{min}$ is less than the new value of $j_{max}$. If $j_{min}$ is greater than or equal to $j_{max}$, verification mechanism 414 indicates that the validation of arbiter 408 is undeterminable. If $j_{min}$ is less than $j_{max}$, then verification mechanism 414 sets variable j equal to a new value of $(j_{min}+j_{max})/2$. Then, using a random seed and for only the predetermined time period, verification mechanism 414 again monitors requests 410 and grants 412 to and from arbiter 408 to determine whether arbiter 408 is fairly granting all of requests 410 without starvation. This process repeats until verification mechanism 414 determines that arbiter 408 passes or fails.

If arbiter 408 fails to grant all of requests 410 during the predetermined time period, then verification mechanism 414 extracts a random seed from the trace of the results of comparing grants 412 to requests 410 and uses the extracted random seed from the trace as a fixed seed of a constant c, which indicates underapproximation. Then, using the fixed seed and for only the predetermined time period, verification mechanism 414 again monitors requests 410 and grants 412 to and from arbiter 408 to determine whether arbiter 408 is granting all of requests 410 without starvation. If arbiter 408 fails to grant all of requests 410 during the predetermined time period using the fixed seed, then verification mechanism 414 indicates arbiter 408 as failing and generates a trace demonstrating the failure.

If during the predetermined time period arbiter 408 grants all of requests 410 or if the predetermined time period expires before verification mechanism 414 validates or invalidates arbiter 408, then verification mechanism 414 resets $j_{min}$ to equal the current value of j. Verification mechanism 414 then determines whether the new value of $j_{min}$ is less than the value of $j_{max}$. If $j_{min}$ is greater than or equal to $j_{max}$, verification mechanism 414 indicates that the validation of arbiter 408 is undeterminable. If $j_{min}$ is less than $j_{max}$, then verification mechanism 414 sets variable j equal to a new value of $(j_{min}+j_{max})/2$. Then, using a random seed and for only the predetermined time period, verification mechanism 414 again monitors requests 410 and grants 412 to and from arbiter 408 to determine whether arbiter 408 is granting all of requests 410 without starvation. This process repeats until verification mechanism 414 determines that arbiter 408 passes or fails.

Thus, verification mechanism 414 iteratively checks bounded starvation with different bounds and creates underapproximations of the original arbiter by initializing the LFSR with different seeds. Verification mechanism 414 iteratively checks property p_{j} at each value of j using a binary search. If checking of a bounded-starvation property p_{j} times out, verification mechanism 414 checks another bounded-starvation property with a lower bound. If a property p_{j} fails, verification mechanism 414 restricts the LFSR's seed value to a fixed seed, denoted by seed_{j} and checks whether the original property holds in the fixed-seed LFSR.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 5:
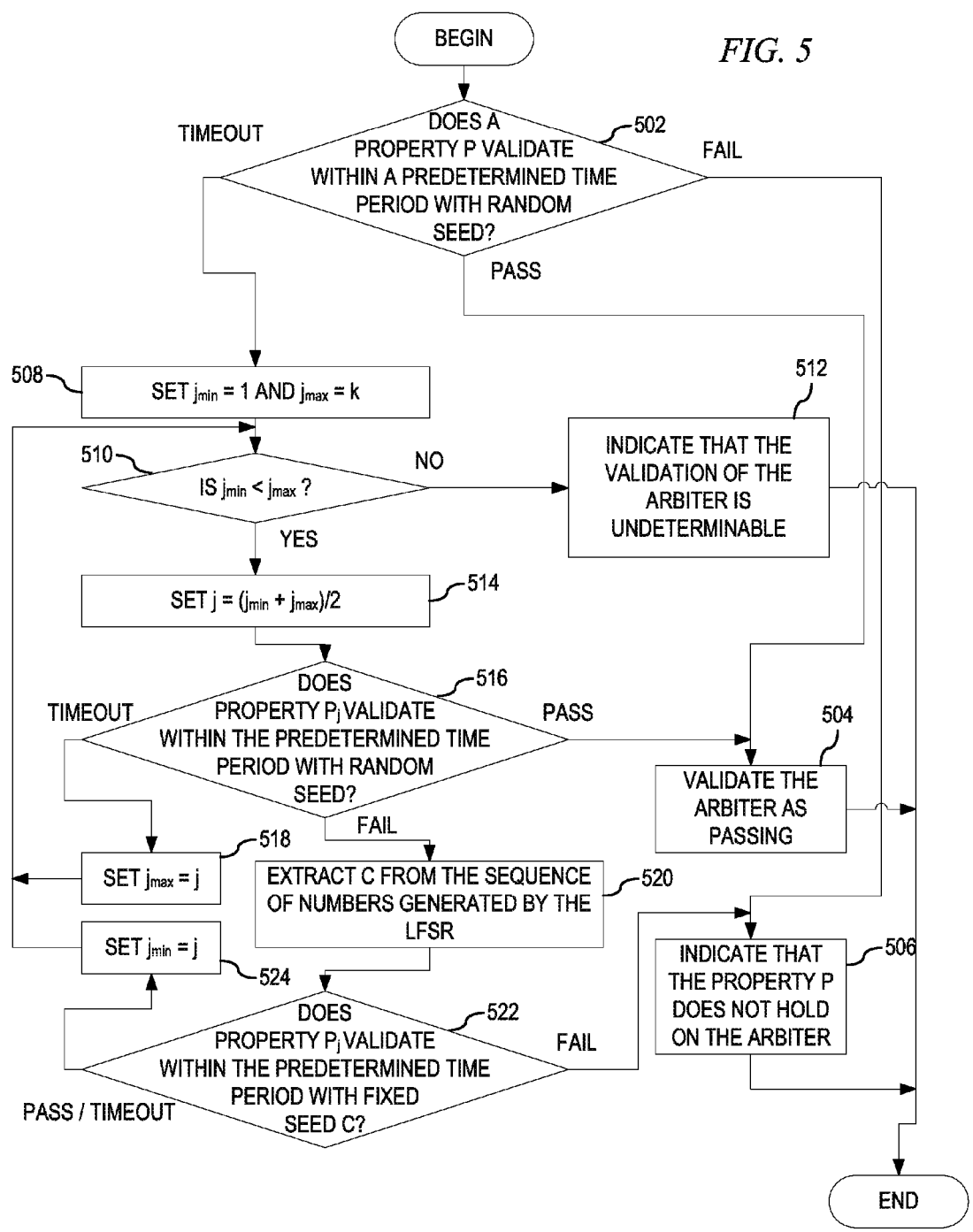
FIG. 5 provides a flowchart outlining example operations of formally verifying random priority-based arbiters using property strengthening and underapproximations in accordance with an illustrative embodiment.

Referring now to FIG. 5, this figure provides a flowchart outlining example operations of formally verifying random priority-based arbiters using property strengthening and underapproximations in accordance with an illustrative embodiment. As the operation begins, the verification mechanism checks whether a predefined property P may be validated using a random priority-based arbiter in a predetermined time period (step 502). That is, using a random seed and for only the predetermined time period, the verification mechanism monitors a set of requests (inputs) and a set of grants (outputs) to and from the arbiter to determine whether the arbiter is granting all of the set of requests without starvation. If at step 502 the validation mechanism validates that the arbiter has all of the set of requests within the predetermined time period, then the verification mechanism validates the arbiter as passing (step 504), with the operation ending thereafter. If at step 502 the validation mechanism determines that the arbiter has failed to grant one request in a predefined bound k within the predetermined time period, then the verification mechanism indicates that the property P does not hold on the arbiter (step 506) and generates a trace demonstrating the failure, with the operation ending thereafter.

Still using the predefined property P, if at step 502 the predetermined time period expires before the verification mechanism validates or invalidates the arbiter, then the verification mechanism sets a $j_{min}$ variable equal to 1 and a $j_{max}$ variable equal to a maximum number of cycles k allowed between a request and a grant as determined by a specification set by a user (step 508). The verification mechanism then determines whether $j_{min}$ is less than $j_{max}$ (step 510). If at step 510 the verification mechanism determines that $j_{min}$ is not less than $j_{max}$, the verification mechanism indicates that the validation of the arbiter is undeterminable (step 512). If at step 510 the verification mechanism determines that $j_{min}$ is less than $j_{max}$, then the verification mechanism sets a variable j equal to a value of $(j_{min}+j_{max})/2$ (step 514), which indicates property strengthening. That is, the verification mechanism sets the number of cycles allowed between a request and a grant as specified to approximately half in order to validate the arbiter faster.

Then, using a random seed, the new property $P_j$ and for only the predetermined time period, the verification mechanism again monitors the set of requests and the set of grants to and from the arbiter to determine whether the arbiter is fairly granting all of the set of requests bits without starvation (step 516). If at step 516 the validation mechanism validates that the arbiter has granted all of the set of requests within the predetermined time period, then the verification mechanism validates the arbiter as passing (step 504), with the operation ending thereafter. If at step 516 the predetermined time period expires before the verification mechanism validates or invalidates the arbiter, the verification mechanism resets $j_{max}$ to equal the value of j (step 518), with the operation returning to step 510 thereafter.

If at step 516 the validation mechanism determines that arbiter 408 has failed to grant one of the requests, then the verification mechanism extracts a random seed from the trace of the results of comparing the set of grants to the set of requests and uses the extracted random seed as a fixed seed of a constant c (step 520), which indicates underapproximation. Then, using the fixed seed and for only the predetermined time period, the verification mechanism again monitors the set of requests and the set of grants to and from the arbiter to determine whether the arbiter is fairly granting all of the set of requests without starvation (step 522). If at step 522 the validation mechanism finds that the arbiter has failed to grant one request within the predetermined time period, then the verification mechanism indicates that the property P does not hold on the arbiter (step 506), with the operation ending thereafter.

If at step 522 the validation mechanism validates that arbiter is fairly granting all of the set of requests within the predetermined time period or if at step 522 the predetermined time period expires before the verification mechanism validates or invalidates the arbiter, then the verification mechanism resets $j_{min}$ to equal the current value of j (step 524), with the operation returning to step 510 thereafter.

The illustrative embodiments provide mechanisms to uncover bugs leading to long latencies before requestors are granted in such complex arbiters. If the bounded property fails, the illustrative embodiments investigate the counter-example and attempt to either fix the problem by increasing the bound or to use the information from the counter-example to underapproximate the original design. While the examples in the illustrative embodiments are directed to a LFSR, one of ordinary skill in the art will recognize that the concepts may be easily generalized to other schemes (besides LFSRs) to implement a random priority function. For example, the presented concepts may, in fact, be generalized to model checking of general-purpose systems without departing from the spirit and scope of the invention.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for general purpose model checking. The verification mechanism checks strengthened properties on the original model to aid in finding an efficient underapproximation for bug hunting on the original model. If any of the strengthened properties pass on the original model, an implication may be made that the original property passes as well. If any of the strengthened properties fails then, heuristically, the strengthened properties have some information leading to a fail of the original property. This information may be extracted, and used to guide the search for a failure on the original property. This is achieved by defining an underapproximation of the model and checking for the validity of the property on it.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for formally verifying random priority-based arbiters, the method comprising:

monitoring, by a processor, a set of input ports and a set of output ports to and from a random priority-based arbiter operating under a predefined property for a first predetermined time period;

determining, by the processor, whether the random priority-based arbiter is blocking one of the set of output ports or the set of input ports from either sending or receiving data for the first predetermined time period using a random seed;

responsive to the first predetermined time period expiring before the processor determines whether the random priority-based arbiter is blocking one of the set of output ports or the set of input ports using the random seed, determining, by the processor, whether the random priority-based arbiter is blocking one of the set of output ports or the set of input ports within a second predetermined time period using the random seed and at least one of property strengthening or underapproximation; and responsive to the processor determining that the random priority-based arbiter satisfies a non-blocking specification such that not one of the set of output ports or the set of input ports is blocked within the second predetermined time period using the random seed and either property strengthening or underapproximation, validating, by the processor, that the random priority-based arbiter satisfies the non-blocking specification.

2. The method of claim 1, wherein determining whether the random priority-based arbiter is blocking one of the set of output ports or the set of input ports within the second predetermined time period using the random seed and property strengthening comprises:

setting, by the processor, a $j_{min}$ variable equal to 1 and a $j_{max}$ variable equal to a maximum number of cycles k allowed between a request and a grant as determined by a specification set by a user;

determining, by the processor, whether $j_{min}$ is less than $j_{max}$;

responsive to $j_{min}$ being less than $j_{max}$, setting, by the processor, a variable j equal to a value of $(j_{min}+j_{max})/2$, wherein setting j is equal to the value of $(j_{min}+j_{max})/2$ reduces a number of cycles allowed between the request and the grant as specified by the user to half in order to validate the random priority-based arbiter faster;

monitoring, by the processor, the set of input ports and the set of output ports to and from the random priority-based arbiter;

determining, by the processor, whether the random priority-based arbiter is blocking one of the set of output ports or the set of input ports within the second predetermined time period; and responsive to the processor determining that the random priority-based arbiter satisfies the non-blocking specification within the second predetermined time period, validating, by the processor, that the random priority-based arbiter satisfies the non-blocking specification.

3. The method of claim 2, further comprising:

responsive to $j_{min}$ being greater or equal to $j_{max}$, indicating, by the processor, that the validation of the arbiter is undeterminable.

4. The method of claim 2, further comprising:

responsive to the processor determining that the random priority-based arbiter is blocking one of the set of output ports or the set of input ports within the second predetermined time period, extracting, by the processor, a random seed from a trace demonstrating a blocking of one of the set of output ports or the set of input ports;

using, by the processor, the extracted random seed as a fixed seed of a constant c, wherein using the fixed seed of the constant c indicates underapproximation;

monitoring, by the processor, the set of input ports and the set of output ports to and from the random priority-based arbiter;

determining, by the processor, whether the random priority-based arbiter is blocking one of the set of output ports or the set of input ports within a third predetermined time period using the fixed seed; and responsive to the processor determining that the random priority-based arbiter is blocking one of the set of output ports or the set of input ports within the third predetermined time period using the fixed seed, indicating, by the processor, that the validation of the arbiter is a failure of the non-blocking specification.

5. The method of claim 4, further comprising:

responsive to the processor determining that the random priority-based arbiter fails to satisfy the non-blocking specification within the third predetermined time period using the fixed seed or responsive to the third predetermined time period expiring, resetting, by the processor, $j_{min}$ to equal the current value of j;

determining, by the processor, whether $j_{min}$ is less than $j_{max}$;

responsive to $j_{min}$ being less than $j_{max}$, resetting, by the processor, the variable j equal to a value of $(j_{min}+j_{max})/2$;

monitoring, by the processor, the set of input ports and the set of output ports to and from the random priority-based arbiter;

determining, by the processor, whether the random priority-based arbiter is blocking one of the set of output ports or the set of input ports within a fourth predetermined time period; and responsive to the processor determining that the random priority-based arbiter satisfies the non-blocking specification within the fourth predetermined time period, validating, by the processor, that the random priority-based arbiter satisfies the non-blocking specification.

6. The method of claim 2, further comprising:

responsive to the second predetermined time period expiring before the processor determines whether the random priority-based arbiter is blocking one of the set of output ports or the set of input ports using the random seed, resetting, by the processor, $j_{max}$ to equal the current value of j;

determining, by the processor, whether $j_{min}$ is less than $j_{max}$;

responsive to $j_{min}$ being less than $j_{max}$, resetting, by the processor, the variable j equal to a value of $(j_{min}+j_{max})/2$;

monitoring, by the processor, the set of input ports and the set of output ports to and from the random priority-based arbiter;

determining, by the processor, whether the random priority-based arbiter is blocking one of the set of output ports or the set of input ports within a third predetermined time period; and responsive to the processor determining that the random priority-based arbiter satisfies the non-blocking specification within the third predetermined time period, validating, by the processor, that the random priority-based arbiter satisfies the non-blocking specification.

7. The method of claim 1, further comprising:

responsive to the processor determining that the random priority-based arbiter satisfies the non-blocking specification within the first predetermined time period, validating, by the processor, that the random priority-based arbiter satisfies the non-blocking specification.

8. The method of claim 1, further comprising:

responsive to the processor determining that the random priority-based arbiter is blocking one of the set of output ports or the set of input ports within the first predetermined time period, indicating, by the processor, that the validation of the arbiter is a failure of the non-blocking specification.

9. A computer program product comprising a computer readable storage medium having a computer readable program stored therein, wherein the computer readable program, when executed on a computing device, causes the computing device to:

monitor a set of input ports and a set of output ports to and from a random priority-based arbiter operating under a predefined property for a first predetermined time period;

determine whether the random priority-based arbiter is blocking one of the set of output ports or the set of input ports from either sending or receiving data for the first predetermined time period using a random seed;

responsive to the first predetermined time period expiring before the processor determines whether the random priority-based arbiter is blocking one of the set of output ports or the set of input ports using the random seed, determine whether the random priority-based arbiter is blocking one of the set of output ports or the set of input ports within a second predetermined time period using the random seed and at least one of property strengthening or underapproximation; and responsive to the processor determining that the random priority-based arbiter satisfies a non-blocking specification such that not one of the set of output ports or the set of input ports is blocked within the second predetermined time period using the random seed and either property strengthening or underapproximation, validate that the random priority-based arbiter satisfies the non-blocking specification.

10. The computer program product of claim 9, wherein the computer readable program to determine whether the random priority-based arbiter is blocking one of the set of output ports or the set of input ports within the second predetermined time period using the random seed and property strengthening further causes the computing device to:
set a $j_{min}$ variable equal to 1 and a $j_{max}$ variable equal to a maximum number of cycles k allowed between a request and a grant as determined by a specification set by a user;
determine whether $j_{min}$ is less than $j_{max}$;
responsive to $j_{min}$ being less than $j_{max}$, set a variable j equal to a value of $(j_{min}+j_{max})/2$, wherein setting j is equal to the value of $(j_{min}+j_{max})/2$ reduces a number of cycles allowed between the request and the grant as specified by the user to half in order to validate the random priority-based arbiter faster;
monitor the set of input ports and the set of output ports to and from the random priority-based arbiter;
determine whether the random priority-based arbiter is blocking one of the set of output ports or the set of input ports within the second predetermined time period; and
responsive to the processor determining that the random priority-based arbiter satisfies the non-blocking specification within the second predetermined time period, validate that the random priority-based arbiter satisfies the non-blocking specification.

11. The computer program product of claim 10, wherein the computer readable program further causes the computing device to:
responsive to $j_{min}$ being greater or equal to $j_{max}$, indicate that the validation of the arbiter is undeterminable.

12. The computer program product of claim 10, wherein the computer readable program further causes the computing device to:
responsive to the processor determining that the random priority-based arbiter is blocking one of the set of output ports or the set of input ports within the second predetermined time period, extract a random seed from a trace demonstrating a blocking of one of the set of output ports or the set of input ports;
use the extracted random seed as a fixed seed of a constant c, wherein using the fixed seed of the constant c indicates underapproximation;
monitor the set of input ports and the set of output ports to and from the random priority-based arbiter;
determine whether the random priority-based arbiter is blocking one of the set of output ports or the set of input ports within a third predetermined time period using the fixed seed; and
responsive to the processor determining that the random priority-based arbiter is blocking one of the set of output ports or the set of input ports within the third predetermined time period using the fixed seed, indicate that the validation of the arbiter is a failure of the non-blocking specification.

13. The computer program product of claim 12, wherein the computer readable program further causes the computing device to:
responsive to the processor determining that the random priority-based arbiter fails to satisfy the non-blocking specification within the third predetermined time period using the fixed seed or responsive to the third predetermined time period expiring, reset $j_{min}$ to equal the current value of j;
determine whether $j_{min}$ is less than $j_{max}$;
responsive to $j_{min}$ being less than $j_{max}$, reset the variable j equal to a value of $(j_{min}+j_{max})/2$;
monitor the set of input ports and the set of output ports to and from the random priority-based arbiter;
determine whether the random priority-based arbiter is blocking one of the set of output ports or the set of input ports within a fourth predetermined time period; and
responsive to the processor determining that the random priority-based arbiter satisfies the non-blocking specification within the fourth predetermined time period, validate that the random priority-based arbiter satisfies the non-blocking specification.

14. The computer program product of claim 10, wherein the computer readable program further causes the computing device to:
responsive to the second predetermined time period expiring before the processor determines whether the random priority-based arbiter is blocking one of the set of output ports or the set of input ports using the random seed, reset $j_{max}$ to equal the current value of j;
determine whether $j_{min}$ is less than $j_{max}$;
responsive to $j_{min}$ being less than $j_{max}$, reset the variable j equal to a value of $(j_{min}+j_{max})/2$;
monitor the set of input ports and the set of output ports to and from the random priority-based arbiter;
determine whether the random priority-based arbiter is blocking one of the set of output ports or the set of input ports within a third predetermined time period; and
responsive to the processor determining that the random priority-based arbiter satisfies the non-blocking specification within the third predetermined time period, validate that the random priority-based arbiter satisfies the non-blocking specification.

15. An apparatus, comprising:
a processor; and
a memory coupled to the processor, wherein the memory comprises instructions which, when executed by the processor, cause the processor to:
monitor a set of input ports and a set of output ports to and from a random priority-based arbiter operating under a predefined property for a first predetermined time period;
determine whether the random priority-based arbiter is blocking one of the set of output ports or the set of input ports from either sending or receiving data for the first predetermined time period using a random seed;
responsive to the first predetermined time period expiring before the processor determines whether the random priority-based arbiter is blocking one of the set of output ports or the set of input ports using the random seed, determine whether the random priority-based arbiter is blocking one of the set of output ports or the set of input ports within a second predetermined time period using the random seed and at least one of property strengthening or underapproximation; and responsive to the processor determining that the random priority-based arbiter satisfies a non-blocking specification such that not one of the set of output ports or the set of input ports is blocked within the second predetermined time period using the random seed and either property strengthening or underapproximation, validate that the random priority-based arbiter satisfies the non-blocking specification.

16. The apparatus of claim 15, wherein the computer instructions to determine whether the random priority-based arbiter is blocking one of the set of output ports or the set of input ports within the second predetermined time period using the random seed and property strengthening further cause the processor to:

set a $j_{min}$, variable equal to 1 and a $j_{max}$ variable equal to a maximum number of cycles k allowed between a request and a grant as determined by a specification set by a user;

determine whether $j_{min}$ is less than $j_{max}$;

responsive to $j_{min}$ being less than $j_{max}$, set a variable j equal to a value of $(j_{min}+j_{max})/2$, wherein setting j is equal to the value of $(j_{min}+j_{max})/2$ reduces a number of cycles allowed between the request and the grant as specified by the user to half in order to validate the random priority-based arbiter faster;

monitor the set of input ports and the set of output ports to and from the random priority-based arbiter;

determine whether the random priority-based arbiter is blocking one of the set of output ports or the set of input ports within the second predetermined time period; and responsive to the processor determining that the random priority-based arbiter satisfies the non-blocking specification within the second predetermined time period, validate that the random priority-based arbiter satisfies the non-blocking specification.

17. The apparatus of claim 16, wherein the instructions further cause the processor to:

responsive to $j_{min}$ being greater or equal to $j_{max}$, indicate that the validation of the arbiter is undeterminable.

18. The apparatus of claim 16, wherein the instructions further cause the processor to:

responsive to the processor determining that the random priority-based arbiter is blocking one of the set of output ports or the set of input ports within the second predetermined time period, extract a random seed from a trace demonstrating a blocking of one of the set of output ports or the set of input ports;

use the extracted random seed as a fixed seed of a constant c, wherein using the fixed seed of the constant c indicates underapproximation;

monitor the set of input ports and the set of output ports to and from the random priority-based arbiter;

determine whether the random priority-based arbiter is blocking one of the set of output ports or the set of input ports within a third predetermined time period using the fixed seed; and responsive to the processor determining that the random priority-based arbiter is blocking one of the set of output ports or the set of input ports within the third predetermined time period using the fixed seed, indicate that the validation of the arbiter is a failure of the non-blocking specification.

19. The apparatus of claim 18, wherein the instructions further cause the processor to:

responsive to the processor determining that the random priority-based arbiter fails to satisfy the non-blocking specification within the third predetermined time period using the fixed seed or responsive to the third predetermined time period expiring, reset $j_{min}$ to equal the current value of j;

determine whether $j_{min}$ is less than $j_{max}$;

responsive to $j_{min}$ being less than $j_{max}$, reset the variable j equal to a value of $(j_{min}+j_{max})/2$;

monitor the set of input ports and the set of output ports to and from the random priority-based arbiter;

determine whether the random priority-based arbiter is blocking one of the set of output ports or the set of input ports within a fourth predetermined time period; and responsive to the processor determining that the random priority-based arbiter satisfies the non-blocking specification within the fourth predetermined time period, validate that the random priority-based arbiter satisfies the non-blocking specification.

20. The apparatus of claim 16, wherein the instructions further cause the processor to:

responsive to the second predetermined time period expiring before the processor determines whether the random priority-based arbiter is blocking one of the set of output ports or the set of input ports using the random seed, reset $j_{max}$ to equal the current value of j;

determine whether $j_{min}$ is less than $j_{max}$;

responsive to $j_{min}$ being less than $j_{max}$, reset the variable j equal to a value of $(j_{min}+j_{max})/2$;

monitor the set of input ports and the set of output ports to and from the random priority-based arbiter;

determine whether the random priority-based arbiter is blocking one of the set of output ports or the set of input ports within a third predetermined time period; and responsive to the processor determining that the random priority-based arbiter satisfies the non-blocking specification within the third predetermined time period, validate that the random priority-based arbiter satisfies the non-blocking specification.

* * * * *